(12) United States Patent
Vanderleeden et al.

(10) Patent No.: US 10,096,845 B2
(45) Date of Patent: Oct. 9, 2018

(54) METHODS OF FORMING FUEL CELL LAYERS

(71) Applicant: Intelligent Energy Limited, Loughborough (GB)

(72) Inventors: Olen Richard Vanderleeden, Port Moody (CA); Gerard F McLean, West Vancouver (CA); Jeremy Schrooten, Mission (CA); Martin Lagroix, Port Moody (CA); Jean-Louis Iaconis, Burnaby (CA); Anna Stukas, Vancouver (CA)

(73) Assignee: Intelligent Energy Limited, Loughborough (GB)

(*) Notice: Subject to any disclaimer, the term of this patent is extended or adjusted under 35 U.S.C. 154(b) by 256 days.

(21) Appl. No.: 14/359,041

(22) PCT Filed: Nov. 16, 2012

(86) PCT No.: PCT/US2012/065694
§ 371 (c)(1),
(2) Date: May 16, 2014

(87) PCT Pub. No.: WO2013/075037
PCT Pub. Date: May 23, 2013

(65) Prior Publication Data
US 2014/0317920 A1    Oct. 30, 2014

Related U.S. Application Data

(60) Provisional application No. 61/561,647, filed on Nov. 18, 2011.

(51) Int. Cl.
*H01K 3/10*    (2006.01)
*H01M 8/0286*    (2016.01)
(Continued)

(52) U.S. Cl.
CPC ....... *H01M 8/0286* (2013.01); *H01M 8/0247* (2013.01); *H01M 8/0267* (2013.01);
(Continued)

(58) Field of Classification Search
CPC .............................. Y02E 60/50; Y02P 70/56; H01M 2008/1293; Y10T 29/49108; Y10T 428/2848; Y02B 90/18
(Continued)

(56) References Cited

U.S. PATENT DOCUMENTS 3,135,935 A * 6/1964 Eugelbrecht ......... H01B 13/016
112/440
3,722,440 A * 3/1973 Igarashi ................. D02G 3/441
112/475.09

(Continued)

FOREIGN PATENT DOCUMENTS

CN    1797833 A    7/2006
CN    101981734 A    2/2011
(Continued)

OTHER PUBLICATIONS

"International Application Serial No. PCT/US2012/065694, International Preliminary Report on Patentability dated May 30, 2014", 8 pgs.

(Continued)

*Primary Examiner* — Thiem Phan
(74) *Attorney, Agent, or Firm* — Baker & Hostetler LLP (57) ABSTRACT

The present invention relates to electrically conductive paths in planar substrates. Various embodiments provide a method of forming one or more electrically conductive paths in a planar substrate, wherein substantially none of the substrate is removed during formation of the path. In various embodiments, by avoiding the removal of substrate during formation of the electrically conductive path, problems caused by
(Continued)

residual substrate material can be advantageously avoided. In various embodiments, the planar substrate with the electrically conductive path can be used to make a planar fuel cell array.

30 Claims, 6 Drawing Sheets

(51) Int. Cl.
*H01M 8/2483* (2016.01)
*H01M 8/0267* (2016.01)
*H01M 8/1004* (2016.01)
*H01M 8/241* (2016.01)
*H01M 8/0247* (2016.01)
*H01M 8/0271* (2016.01)
*H01M 8/0276* (2016.01)
*H01M 8/1018* (2016.01)

(52) U.S. Cl.
CPC ....... *H01M 8/0271* (2013.01); *H01M 8/1004* (2013.01); *H01M 8/241* (2013.01); *H01M 8/2483* (2016.02); *H01M 8/0276* (2013.01); *H01M 2008/1095* (2013.01); *Y10T 29/49165* (2015.01)

(58) Field of Classification Search
USPC .................. 29/852, 825, 829, 831, 845, 846; 429/465, 479, 483, 508, 517, 535
See application file for complete search history.

(56) References Cited

U.S. PATENT DOCUMENTS

| | | |
|---|---|---|
| 4,061,557 A | 12/1977 | Nishizawa et al. |
| 7,378,176 B2 | 5/2008 | McLean et al. |
| 2004/0219412 A1 | 11/2004 | Kimura et al. |
| 2005/0250004 A1 | 11/2005 | McLean et al. |
| 2007/0134531 A1* | 6/2007 | Kimura ............... H01M 8/006 429/483 |
| 2009/0081493 A1 | 3/2009 | Schrooten et al. |
| 2009/0162722 A1 | 6/2009 | Schrooten et al. |
| 2011/0003229 A1 | 1/2011 | Schrooten et al. |
| 2011/0236785 A1 | 9/2011 | Imura et al. |

FOREIGN PATENT DOCUMENTS

| | | |
|---|---|---|
| JP | 2004-014322 A | 1/2004 |
| JP | 2011-515794 A | 5/2011 |
| TW | 201340451 A | 10/2013 |
| WO | WO 2009/105896 A1 | 9/2009 |
| WO | WO 2011/079377 A1 | 7/2011 |
| WO | WO-2011079378 A1 | 7/2011 |
| WO | WO-2013075037 A1 | 5/2013 |

OTHER PUBLICATIONS

"International Application Serial No. PCT/US2012/065694, International Search Report dated Jan. 28, 2013", 2 pgs.
"International Application Serial No. PCT/US2012/065694, Written Opinion dated Jan. 28, 2013", 6 pgs.

* cited by examiner

METHODS OF FORMING FUEL CELL LAYERS

CLAIM OF PRIORITY

This application is a U.S. National Stage Filing under 35 U.S.C. 371 from International Application No. PCT/US2012/065685, filed on 16 Nov. 2012, and published as WO 2013/075032 A1 on 23 May 2013, which claims the benefit of priority of U.S. Provisional Patent Application Ser. No. 61/561,647, entitled "METHODS OF FORMING FUEL CELL LAYERS," filed on Nov. 18, 2011, which applications are incorporated by reference herein in their entireties.

FIELD OF THE INVENTION

The subject matter of the present invention relates to methods for the manufacture of planar fuel cell arrays.

BACKGROUND

Electrochemical cells, such as fuel cells, include pathways for the transport of charged chemical species. Ions from electrochemical reactions are transported through an ion-exchange membrane (e.g., a proton exchange membrane) and electrons are transferred between adjacent fuel cells. In some types of cells, a path for proton conductivity is integrated within the fuel cell while a path for electron conductivity is created between adjacent fuel cells to provide an electrical circuit from the positive and negative electrical connections of the fuel cell device.

A class of fuel cell architecture is emerging for use in micro fuel cell applications that includes a thin layered fuel cell structure with neighboring fuel cells arranged adjacent to each other in an array. The fuel call array can include multiple fuel cells with electrically conductive paths between them. There exists a need for improved manufacturing methods for producing such fuel cell architecture.

SUMMARY

Various embodiments provide a method for forming an electrically conductive path in a planar substrate. The method includes at least one of obtaining and providing a planar substrate having first and second major faces and a first volume. The substrate includes at least one ionically conductive region. The method includes forming at least one aperture in the at least one ionically conductive region of the planar substrate. The aperture extends between the first and second faces. The aperture defines a punctured planar substrate having a second volume substantially the same as the first volume. The method also includes disposing an electrically conductive material in the aperture of the punctured planar substrate, to give the electrically conductive path extending between the first and second face. The electrically conductive path is sealed to the substrate such that the substrate is substantially gas-tight between the first and second face.

Various embodiments provide a method for forming an electrically conductive path in a planar substrate. The method includes at least one of obtaining and providing a planar substrate having a first and second major face. The substrate includes at least one ionically conductive region. The substrate includes making at least one aperture in the at least one ionically conductive region of the planar substrate. The aperture extends between the first and second faces. Substantially none of the substrate is removed during aperture formation. The method includes disposing an electrically conductive material in the aperture to give an electrically conductive path including the electrically conductive material. The electrically conductive path extends between the first and second face. The electrically conductive path is sealed to the substrate such that the substrate is substantially gas-tight between the first and second face.

Various embodiments provide a method for forming an electrically conductive path in a planar substrate. The method includes at least one of obtaining and providing a planar ion-conducting substrate having first and second major faces and a first volume. The substrate includes at least one ionically conductive region. The method includes forming at least one aperture in the at least one ionically conductive region of the planar substrate. The aperture extends between the first and second faces. The aperture defines a punctured planar substrate having a second volume substantially the same as the first volume. The method includes disposing an electrically conductive material in the aperture of the punctured planar substrate, to give the electrically conductive path extending between the first and second face. The planar substrate includes an upper first volume that includes the first major face, and a lower first volume that includes the second major face. The punctured planar substrate includes an upper second volume that includes that first major face and that corresponds to the upper first volume, and a lower second volume that includes the second major face and that corresponds to the lower first volume. The first upper volume is substantially the same as the second upper volume. The first lower volume is substantially the same as the second lower volume. The electrically conductive path is sealed to the substrate such that the substrate is substantially gas-tight between the first and second face.

In a conventional method of generating a conductive pathway through a substrate, the substrate material can be removed to form an orifice and conductive material can be placed in the orifice, resulting in bits of residual substrate material that can be problematic. For example, the residual material can remain attached at one or more points to the substrate, causing an uneven or distorted surface. In another example, the residual material can clog or otherwise interfere with tools or devices. In another example, the residual material can accumulate at other locations on the substrate or on the machinery, and can cause various problems. In one example, residual material on the surface of the substrate can become fused to the substrate surface after a pressing step, negatively affecting the properties of the substrate. In another conventional method of generating a conductive pathway through a substrate, the substrate material can be removed using a method such as laser ablation. However, the great heat associated with laser treatment can negatively alter the local properties of the substrate, such as mechanical or electrical characteristics.

Various embodiments of the present invention provide certain advantages over other fuel cell layers or other methods of forming a conductive path in a substrate. Unexpectedly, embodiments of the present invention accomplish the formation of a conductive pathway through the plane of a substrate without the removal of substrate material. Thus, various embodiments of the present invention allow the avoidance of the problems that can occur when material is removed to form a conductive pathway through a substrate. In some examples, embodiments allow avoidance of residual material (e.g. "chads") clogging tools or devices, or accumulation of residual material in various locations. In some examples, embodiments allow avoidance of alteration of the properties of the substrate in regions near the formed aperture. By avoiding problems associated with removal of substrate material, various embodiments provide a simpler and more efficient method of forming a conductive pathway in a substrate than other methods. By not removing material, various embodiments waste less material than other methods. In some embodiments, by not removing material, it is simpler to achieve a sealed substrate with a conductive pathway, wherein the substrate is sealed against liquid or gas leakage. In some embodiments, the conductive material, or a clamp or preformed structure that includes the conductive material, can provide a compressive or sealing force on the membrane. In some embodiments, a preformed structure that supports the conductive material can allow a greater variety of conductive materials to be used.

In certain embodiments, forming the conductive pathways in a generally continuous substrate sheet can avoid joining dissimilar materials with large joining interfaces, as required by other methods. For example, some types of electrolyte materials are difficult to join well to other materials, a serious problem when assembling fuel cells from strips of electrolyte; in some examples by forming the conductive pathways in the substrate using embodiments of the present invention these difficulties can be avoided.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Throughout the following description, specific details are set forth in order to provide a more thorough understanding of the invention. However, the invention can be practiced without these particulars. In other instances, well known elements have not been shown or described in detail in order to avoid unnecessarily obscuring the invention. The drawings show, by way of illustration, specific embodiments in which the invention can be practiced. These embodiments can be combined, other elements can be utilized or structural or logical changes can be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" or "top" and "below" or "bottom" are used to describe two different directions in relation to the center of a composite and the terms "upper" and "lower" can be used to describe two different surfaces of a composite. However, these terms are used merely for ease of description and are not to be understood as fixing the orientation of a fuel cell layer of the described embodiments. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100, or less than or equal to 100 but greater than or equal to 1, shall also include the ranges 1-80, 2-76, or any other numerical range that falls between 1 and 100.

Multiple examples of composite layer architecture, including arrays of electrochemical cells such as fuel cell layers that can be utilized as a composite layer subject to the inventive method are described in commonly-assigned US Patent App. Pub. No. 2011/0003229, filed 27 Feb. 2009 as PCT App. No. PCT/CA/09/00253 and entitled ELECTROCHEMICAL CELL AND MEMBRANES RELATED THERETO, the disclosure of which is herein incorporated by reference in its entirety.

A fuel cell layer that includes a plurality of unit cells can be constructed by providing a composite substrate that includes a plurality of ion conducting components and a plurality of electrically conductive components. Such a substrate could be provided, for example, by explicitly removing material from an ion-conducting membrane sheet to form one or more apertures, which are then filled with a conductive material to create one or more discrete electrical paths through the sheet. Examples of such a method are described in commonly-assigned US Patent App. Pub. No. 2011/0236785 filed 25 Mar. 2010 and entitled FUEL CELL LAYER, FUEL CELL SYSTEM AND METHOD FOR FABRICATING THE FUEL CELL LAYER, the disclosure of which is herein incorporated by reference in its entirety. In the case of micro fuel cells, apertures are generally required to be small, so that the filling material does not need to span a large gap. Electrically conductive passageways can be used as interconnects, to electrically connect neighboring unit fuel cells. These paths can be required to penetrate a substrate from one major surface to the opposite surface.

The inventive method allows for forming through-plane conductive paths in continuous sheet material by puncturing the sheet material. This differs from prior art methods which remove material from a substrate, leaving behind explicit holes. The continuous sheet material can be uniformly proton conducting material, a composite of proton conducting and dielectric materials, or a composite of proton conducting and dielectric materials with regions of electrical conductivity disposed on or near surfaces of the materials. By minimizing the area required for unit cell interconnects, the overall active area of a fuel cell can be maximized.

The inventive method avoids the creation of small chads which can clog tools or create out of plane distortions when mechanical punches are used to remove material. The inventive method also avoids the creation of surface and regional effects that alter the mechanical characteristics of the continuous sheet, when ablation techniques are used for material removal. Such consequences make subsequent processing steps such as pressing difficult to complete. Thus, the inventive method minimizes distortion of the continuous sheet material or the alteration of its mechanical characteristics.

Definitions

As used herein, "catalyst" refers to a material or substance that assists in starting or increasing the rate of a reaction, without being modified or consumed itself. Catalyst layers can include any type of electrocatalyst suitable for the application at hand. Catalysts or catalyst layers can include pure platinum, carbon supported platinum, platinum black, platinum ruthenium, platinum-cobalt, palladium, copper, tin oxide, silicon oxide, nickel, gold, graphite, mixtures of carbon black and one or more binders. Binders can include ionomers, polypropylene, polyethylene, polycarbonate, polyimides, polyamides, fluoropolymers and other polymer materials, and can be films, powders, or dispersions. An example of a polyimide includes Kapton®. An example of a fluoropolymer is PTFE (polytetrafluoroethylene) or Teflon®. Other fluoropolymers include PFSA (perfluorosulfonic acid), FEP (fluorinated ethylene propylene), PEEK (poly ethylene ether ketones) and PFA (perfluoroalkoxyethylene). The binder can also include PVDF (polyvinylidene difluoride) powder (e.g., Kynar®) and silicon dioxide powder. The binder can include any combination of polymers or ionomers. The carbon black can include any suitable finely divided carbon material such as one or more of acetylene black carbon, carbon particles, carbon flakes, carbon fibers, carbon needles, carbon nanotubes, and carbon nanoparticles.

As used herein, "coating" refers to a conductive thin-layer disposed on the surface of a composite layer. For example, the coating can be a catalyst layer or electrodes, such as anodes and cathodes.

As used herein, a "composite layer" or "composite" refers to a layer including at least two surfaces having a thickness, where one or more ion conducting passages and one or more electrically conductive passages are defined between the surfaces. Ion conducting properties and electrically conductive properties of a composite layer can be varied in different regions of the composite by defining ion conducting passages and electrically conductive passages with varying sizes, shapes, densities or arrangements. A composite layer can, for example, be formed by selectively treating a non-ion-conducting sheet to form ion-conducting regions, as described, for example in the commonly-assigned U.S. Pat. No. 7,378,176 filed 2 Feb. 2005 and entitled MEMBRANES AND ELECTROCHEMICAL CELLS INCORPORATING SUCH MEMBRANES, the disclosure of which is herein incorporated by reference in its entirety. A composite layer can be impermeable, or substantially impermeable, to a fluid (e.g. a gas or a liquid). A composite layer can include dielectric materials. A composite layer is capable of providing desired electrical conductivity, ionic conductivity, gas permeability, and mechanical strength characteristics over the entire spatial extent of the composite layer or of varying degrees over different regions of the composite layer. Composite layers can be used as substrates. Suitable composite layers to which the inventive methods can be applied include the composite layers described herein and any composite layer that is described in any of the patent documents incorporated herein by reference and includes or could include a coating layer disposed over or adjacent to one or both of the major surfaces of the composite layer.

As used herein, a "dielectric material" refers to a substance exhibiting negligible electrical conductivity. Dielectric materials can be used as substrates, for example. Dielectric materials can be understood to include ion-conducting materials, non-ion-conducting materials, or combinations thereof. Examples of ion-conducting materials include any ionomer or electrolyte suitable to a given application, such as ion-exchange polymers (i.e. Nafion™), alkaline solutions, acidic solutions, phosphoric acid, alkali carbonates, and oxide ion-conducting ceramics. Examples of non-ion-conducting materials include polymers, such as polypropylene, polyethylene, polycarbonate, poly ethylene ether ketones, polyimides, polyamides, fluoropolymers and other polymer films. An example of a polyimide includes Kapton™ film. An example of a fluoropolymer is PTFE (polytetrafluoroethylene) or Teflon™ film. Other fluoropolymers include PFSA (perfluorosulfonic acid), FEP (fluorinated ethylene propylene) and PFA (perfluoroalkoxyethylene). Dielectric materials can also include reinforced composite materials such as fiberglass, any suitable non polymer materials such as silicon or glass, and combinations thereof. The dielectric material can include an electrolyte. The electrolyte can be a solid electrolyte membrane.

As used herein, "electrochemical reaction layer" refers to regions in which electrochemical reactions take place. An electrochemical reaction layer can include materials or components that act as anodes, cathodes or both in an electrochemical reaction. The electrochemical reaction layer can include an electrode material, a catalyst material, electrically conductive materials, gas permeable materials and water active materials (i.e. hydrophilic and hydrophobic materials), and can include structural additives to provide mechanical durability. The composition of electrochemical reaction layers can be optimized to promote reactions.

As used herein, "electrode regions," "electrode materials," or "electrodes" refer to materials or components that act as anodes, cathodes or both in an electrochemical reaction. Electrode regions can include catalysts. Electrode regions can include pure platinum, platinum black, carbon-supported platinum, palladium, copper, nickel, gold, woven and non-woven carbon fiber paper, carbon paper, mixtures of carbon black, carbon powder, graphite powder, expanded graphite, conductive adhesive such as graphite filled epoxy, conductive primer such as graphite filled Nafion™, Nafion™, or combinations thereof. Electrode regions can also include a microporous layer. A microporous layer is a component whose function is to promote thermal, water, and electrical transport in the electrode as well as to provide structural support in the electrode. The microporous layer can include graphite powder, carbon powder, carbon needles, carbon nanotubes, graphite flakes, graphite needles, tin oxide, silicon oxide, and a binder. A binder can include ionomers, polypropylene, polyethylene, polycarbonate, polyimides, polyamides, fluoropolymers, and other polymer materials, and can be films, powders, or dispersions. An example of a polyimide includes Kapton™. An example of a fluoropolymer is PTFE (polytetrafluoroethylene) or Teflon™. Other fluoropolymers include PFSA (perfluoroalkoxyethylene). The binder can also include PVDF (polyvinylidene difluoride) powder (e.g., Kynar™) and silicon dioxide powder. The binder can include any combination of polymers or ionomers. Examples of such a microporous layer include those commercially available, in the form of a coated carbon paper and coated carbon fiber paper. Electrode regions can include performance enhancing layers as described in commonly-assigned PCT Application Publication No. WO 2011/079378 filed 23 Dec. 2010, entitled "PERFORMANCE ENHANCING LAYERS FOR FUEL CELLS," the disclosure of which is incorporated herein in its entirety by reference. Electrode regions can be disposed on the surface of a composite layer, in the form of a coating. "Electrode regions" and "electrodes" will herein be used interchangeably.

As used herein, an "electron conducting component" or "electrically conductive component" refer to a component of a composite layer that provides an electrically conductive pathway. The electron conducting component can provide an electrically conductive pathway, or pathways, from one surface of a composite layer, through the composite, to the opposite surface of the composite layer, for example. Electron conducting components include one or more materials that are electrically conductive, for example, metals, metal foams, carbonaceous materials, electrically conductive ceramics, electrically conductive polymers, graphite, graphite filled epoxy, metal filled epoxy, expanded graphite, carbon, carbon filled epoxy, combinations thereof, and the like.

As used herein, an "electrolyte membrane" refers to a component of a composite layer that provides an ion conductive pathway. Ion conducting components include an ion conducting material, such as a fluoropolymer-based ion conducting material or a hydrocarbon-based ion conducting material. Electrolyte membranes can also be referred to herein as "electrolytes" or an "ion conducting component." Ion conducting paths must be spaced such that protons flow along each path rather than jumping from one path to another so as to have effect of flowing in discrete ion conductive paths.

As used herein, "plane" refers to a two-dimensional hypothetical surface having a determinate extension and spatial direction or position. For example, a rectangular block can have three planes orthogonal to one another. Planes can be defined relative to one another using angles greater or less than 90 degrees, for example.

As used herein, a "fuel cell array" refers to a plurality of individual unit cells. The plurality of cells can be formed on a sheet of ion exchange membrane material or other substrate or can be formed by assembling a number of components in a particular manner. Arrays can be formed to any suitable geometry. Individual unit cells in a fuel cell array can be electrically connected via conductive passageways. For example, a conductive passageway can connect the anode of a unit fuel cell with the cathode of a neighboring unit fuel cell to create a series electrical connection. Examples of planar arrays of fuel cells are described in commonly-owned U.S. Patent App. Pub. No. 2005/0250004 filed on 2 Feb. 2005 and entitled ELECTROCHEMICAL CELLS HAVING CURRENT CARRYING STRUCTURES UNDERLYING ELECTROCHEMICAL REACTION LAYERS, the disclosure of which is herein incorporated by reference in its entirety. Fuel cells in an array can also follow other planar surfaces, such as tubes (as found in cylindrical fuel cells). Alternately or in addition, the array can include flexible materials that can be conformed to a wide variety of geometries.

As used herein, "substantially" refers to a majority of, or mostly, as in at least about 50%, 60%, 70%, 80%, 90%, 95%, 96%, 97%, 98%, 99%, 99.5%, 99.9%, 99.99%, or at least about 99.999%.

As used herein, "ionically conductive" refers to a material that is ion-conducting.

As used herein, "protonically conductive" refers to a material that is proton-conducting.

FIGS. 1A-1D illustrate a sequential depiction of one embodiment of the inventive method showing a cross-sectional view of an electrically conductive material being disposed in a substrate. The substrate can be any suitable substrate. The substrate can be a continuous sheet. The substrate can be an ion-conducting substrate. The substrate can include at least one region of ion-conductivity. The ion-conducting region of the substrate can, in some examples, be proton-conducting. In some embodiments, the substrate can be a composite layer, including a mixture of an ion-conducting layer and another layer or layers. The ion-conducting substrate, or the ion-conducting region of a substrate, can be less than 10 μm thick, or about 10 μm, 20 μm, 30 μm, 40 μm, 50 μm, 60 μm, 70 μm, 80 μm, 90 μm, 100 μm, 110 μm, 120 μm, 130 μm, 140 μm, or about 150 μm thick or greater. The ion-conducting substrate, or the ion-conducting region of a substrate, can be about 25 to about 50 μm thick, or about 10 to about 100 μm thick, for example.

The substrate can include at least one region of ionic conductivity. The region of ionic conductivity can be a region of protonic conductivity. The region can be any suitable region. The substrate can have first and second major faces. The substrate can have a first volume. The substrate can be a planar substrate. A planar substrate is a substrate that is thin in one dimension. A planar substrate can be flexible or rigid and it can be flat or curved. A planar substrate can have deformations of the plane and still be considered a planar substrate.

Figure 1A:
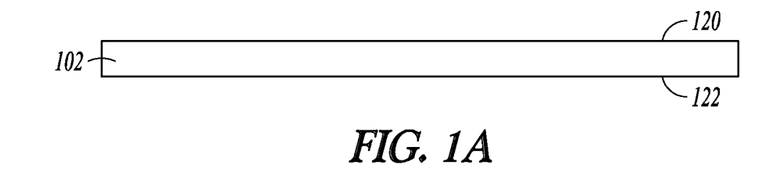
FIGS. 1A-1D illustrate a sequential depiction of an embodiment of the inventive method.
Figure 1B:
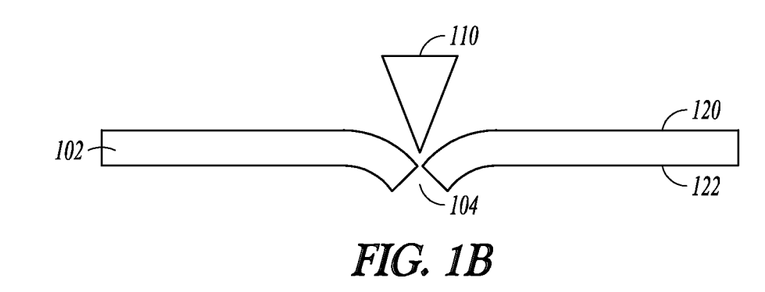

FIG. 1A illustrates a portion of substrate 102 which includes first side 120 (a major face) and second side 122 (a major face). FIG. 1B illustrates a torn region or aperture 104 of substrate 102 formed by mechanical tool 110. The aperture can be any suitable aperture. Mechanical tool 110 can create an irregular opening, such as a dent-like shape with a small hole near the bottom, in the surface of substrate 102 rather than an opening that has top-to-bottom symmetry. Any suitable tool can be used to form the opening. The diameter of the section of the tool used to create such an opening can be less than about 50 μm, 100 μm, 200 μm, 300 μm, 400 μm, 500 μm, 600 μm, 700 μm, 800 μm, 900 μm, 1000 μm, or greater than about 1000 μm, for example. In some examples, the tool that makes the opening does not have a constant diameter but rather is tapered or otherwise patterned as in having a fluted surface or a helical embossment on the surface. In various examples, the tool can be fixed or can rotate about an axis.

One or more openings can be formed in the substrate. The openings can be formed one at a time, or several openings can be formed simultaneously. In some embodiments, about 2, 5, 10, 20, 50, 100, 200, 300, 500, or about 1000 or more apertures can be formed simultaneously. A variety of mechanical tools can be used to form the openings, such as those used in sheet conversion to make perforated sheets, and the like. Other examples include steel rule dies, perforating dies, and pin dies. A die with multiple pins can create multiple irregular openings in the substrate 102. A typical die can be formed with a pin pitch of up to about 50 pins per inch. Such a die can be created with the pins arranged in a single row, or in multiple rows to create more than one set of openings at a time. In an example, a fuel cell array including multiple unit fuel cells such as that illustrated in FIG. 4 can include about 1000 to about 4000 openings.

The tool can puncture the substrate from one major surface to the opposite surface. The tool can be pushed through the substrate to any suitable depth. In some embodiments, the diameter of the tool above the point can increase, remain constant, or a combination thereof; depending on the shape of the tool, a depth of entry into the substrate can be chosen to achieve a desired size of aperture. In other embodiments, the tool also doubles as the electrically conductive material that is inserted in the opening, such as a clamp or other embodiments as described below. In other embodiments, the tool carries with it a conductive element (e.g. a conductive thread), such that the depth of insertion of the tool can be chosen such that the conductive element is carried through the aperture to a suitable depth prior to removal of the tool.

In various embodiments, the aperture formed in the substrate is formed while removing substantially no material from the substrate in order to generate the opening. Although removal of very small quantities of material can occur during aperture formation, the aperture is not formed by removing a core from the aperture, thus none of the material removed is a core-shaped bit (a "chad"). In some embodiments, avoiding removal of material is accomplished by using a cone- or needle-shaped implement for hole formation, wherein a point of the implement punctures the substrate, and a wider portion of the implement follows the point to widen the aperture. As the point moves through the substrate, small amounts of material can be scraped off the sides of the inside of the aperture as it is being formed; however, the removal of the small amount of material is such that substantially no material is removed from the substrate in the generation of the opening. Additionally, the planar substrate can be displaced by the force of the puncturing, causing a dented shape to form around the aperture. In other embodiments, the planar substrate is minimally displaced by the force of puncturing, such that little or no dent shape is formed.

In one way of expressing the lack of removal of material during aperture formation, prior to aperture formation the substrate has a first volume, and after aperture formation the substrate has a second volume, wherein the second volume is approximately the same as the first volume. In some embodiments, the first volume can be defined in any suitable way, encompassing any part of the overall total volume of the substrate, so long as the volume encompasses the entirety of the portion of the substrate through which the aperture is made. Similarly, the second volume can be defined in any suitable way, so long as it corresponds to the first volume. The second volume can correspond to the first volume by representing the same cross-sectional area of the substrate as the first volume when viewed from an approximately orthogonal direction. In some embodiments, the volumes can be defined tightly around the area in which the aperture is formed. In other embodiments, the volume can be defined broadly around the area in which the aperture is formed. When formation of the aperture includes the formation of a dent or other deformation of the plane of the substrate, the volumes can include the entirety of the deformation. In some embodiments, the second volume is about 90%, 95%, 96%, 97%, 98%, 99%, 99.9%, 99.99%, 99.999%, 99.9999%, 99.99999% or greater, or about 100% of the first volume.

In various embodiments, the overall amount of material removed by the formation of the aperture can be small or substantially none; however, in some examples, after formation of the aperture and substantial equality of the first volume and second volume, changes in the properties of the substrate can cause it to shrink or swell, such that the overall volume is greater or less than the original volume. In addition, in various embodiments, the addition of an electrically conductive material to the substrate can result in a greater overall total volume of material than the original (first) volume or the second volume. The comparison between the first and second volume can describe the volume changes resulting from aperture formation, wherein the second volume can be measured soon after, such as immediately after, aperture formation and withdrawal of the puncturing instrument; it is to be understood that further variations in volume of the substrate or in the total volume, such as increases in volume, can occur after formation of the aperture.

Various embodiments of the present invention also avoid creation of "hanging chads", e.g. residual amounts of substrate material hanging from the edges of the aperture or from the edges of the electrically conductive pathway. A hanging chad generally includes a removed core of a hole through a substrate, wherein the core is still attached to some portion of the substrate near the periphery of the formed hole. A hanging chad can be created by removing a core to create a hole in a substrate. Various embodiments avoid creation of hanging chads by avoiding the removal of a core, as described above. Rather, a point is used to puncture the substrate, which avoids pushing a core out of the substrate where it can hang from the edge of the hole.

As described above, formation of the hole can displace substrate material, causing a dent-like shape in the planar substrate. By merely deforming the substrate but not removing material or displacing it to the outside of the hole as a hanging chad, problems caused by hanging chads can be avoided. In one way of describing the possible displacement of material during aperture formation, but the lack of core removal and displacement, the substrate can be envisioned to have an upper and lower volume both before and after aperture formation, wherein the upper and lower volume are substantially the same before and after hole formation. The upper and lower volume of the substrate prior to hole formation correspond to the upper and lower volume of the substrate after hole formation. To "correspond", the division between the upper and lower volumes can occur at approximately the same proportion of the thickness of the substrate throughout, with the exception of the location of the aperture; for planar substrates that are deformed by the formation of the aperture, the division between the upper and lower volumes near the aperture can curve. In contrast, for a substrate having material removed by aperture formation, the upper and lower volumes are different after aperture formation due to the missing material. For the upper and lower volume of the substrate to be substantially the same before and after hole formation, the upper and lower volume after hole formation can be 90%, 95%, 96%, 97%, 98%, 99%, 99.9%, 99.99%, 99.999%, 99.9999%, or about 99.99999% or greater, or about 100% of the upper and lower volume before hole formation.

Figure 1C:
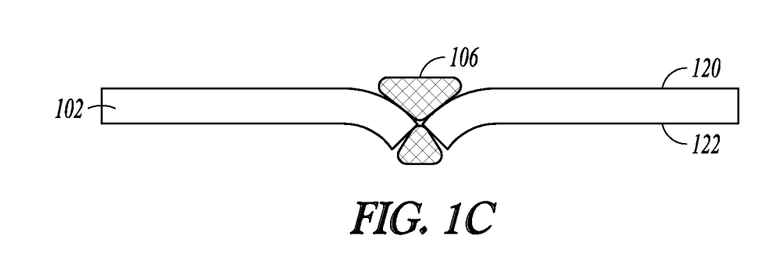

The substrate can be held in place via any suitable means. In some examples, substrate 102 can be held in place in a fixture while a die is aligned with it. The fixture can include mating features to limit or prevent deflection of the substrate as it is being punctured, for example. FIG. 1C illustrates electrically conductive material 106 (which can include catalyst material) placed on first side 120, second side 122, or both sides of substrate 102. The conductive material can be in the form of a slurry, for example. Conductive material can be disposed in one opening at a time, or in multiple openings simultaneously.

Since material has been displaced by the formation of the openings, pressing the processed sheet will tend to push the displaced material back into its original position. This allows the re-sealing of the substrate to be more easily achieved. Pressing can be accomplished using any suitable press, for example, an axial press, a hydraulic press, a mechanical press, a toggle press, or a rotary press, and pressed at any suitable pressure, for example about 50 to about 200 psi, for any suitable time, for example 1-10 minutes. Heat can be applied while the sheet is pressed, the temperature depending on the melting point of the substrate and the characteristics of the conductive material used. For example, the heat applied can be between about 50° C. and about 200° C., or between about 80° C. and about 160° C., or between about 130° C. and about 180° C., or between about 80° C. and about 130° C.

Figure 1D:
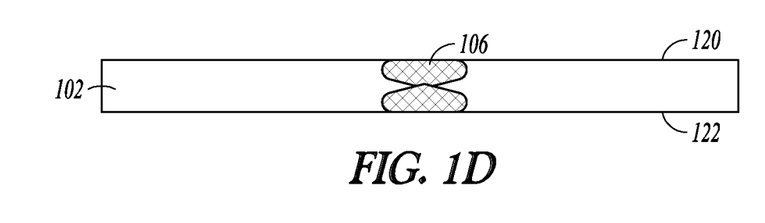

FIG. 1D illustrates the substrate 102 and conductive material 106 after the combination has been pressed. Pressing or otherwise treating the substrate and conductive material is an optional step; in some embodiments, pressing or other treatment occurs, in other embodiments pressing or other treatment does not occur. In some embodiments, the electrically conductive element is sealed to the substrate sufficiently that the substrate is substantially gas impermeable without a pressing step or other treatment. In other embodiments, the ion-conducting layer can be pressed or otherwise treated to seal the layer. In embodiments such as that shown in FIG. 1, pressing can flatten the substrate and press the conductive material into the aperture such that it is both flat and sealed, such that the resulting conductive pathway and the surrounding membrane is gas-tight. During pressing, particles of conductive material are forced into the torn region. Because of the nature of the tearing, an area sufficiently large to promote the required through-plane conductivity in the resulting electrical interconnect can be made. When multiple such interconnects are formed in close proximity to one another, overall low resistance electrical interconnect characteristics can be formed.

The resulting electrically conductive pathway and the substrate surrounding the electrically conductive pathway is substantially gas-tight. The gas-tight property of the resulting substrate with the electrically conductive pathway allows gaseous fuel at various suitable pressures to be provided to a fuel cell that includes the substrate. For the membrane to be substantially gas-tight, it does not have to be 100% gas-tight. For example, some gas molecules can leak through the membrane at sufficiently high pressures over sufficiently long periods of time. However, the gas leakage should be minimal, such that the substrate can be effectively used in a fuel cell. For example, at about 15 psig pressure, less than about 0.3 sccm of gas leaks from one side of the substrate to the other side. For example, at about 5 psig, 10, 15, 20, 25, 30, 35, 40, 45, 50, 55, or at about 60 psig pressure, less than about 0.001 sccm, 0.005, 0.01, 0.05, 0.1, 0.2, 0.3, 0.4, 0.5, 0.6, 0.7, 0.8, 0.9, 1.0, 5, 10, 20, 50, 100, 500, or less than 1000 sccm of gas leaks from one side of the substrate to the other side; wherein the surface area tested for leakage is about 0.001 $cm^2$, 0.005, 0.01, 0.05, 0.1, 1.0, 1.5, 2, 5, 10, 50, 100, 150, 200, 500, or about 1000 $cm^2$. In some embodiments, leak rate can be about 0.0667 $sccm/cm^2$ or less. In some embodiments, the overall leakage rate can be about 0.0032 g/h or less. In some embodiments, the leakage rate from any single point can be about 3 sccm or less or about 0.016 g/h or less.

In various embodiments, the step of forming the aperture can be performed before or after an electrode material (not shown) is disposed on substrate 102. In some embodiments, additional conductive or sealing layers can be applied on or over the electrode material layers in the vicinity of the apertures 104 after the formation of the electrical interconnects. Any suitable number of additional layers can be added, of any suitable material, and of any suitable thickness and suitable shape.

In some embodiments of the invention, an electrically conductive component can be used to penetrate a substrate, e.g. the electrically conductive component is the penetrating tool. In some embodiments, as described above, the penetrating tool can carry with it the electrically conductive component, e.g. the penetrating tool can be a needle-like implement and the conductive component can be in the form of a conductive thread, for example. FIGS. 2A-2D illustrate a sequential depiction of one embodiment of the inventive method showing a cross-sectional view of an ion-conducting layer in which a conductive thread is disposed.

Figure 2A:
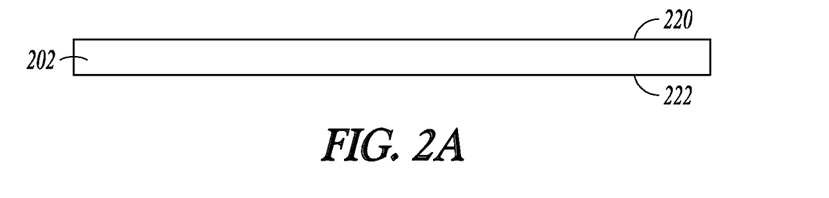
FIGS. 2A-2C illustrate a sequential depiction of an embodiment of the inventive method.

In FIG. 2A, a portion of substrate 202 is similar to a portion of substrate 102 in FIG. 1A. In various embodiments, substrates such as substrate 202 can be an ion-conducting layer, for example; in other embodiments, substrate 202 can be a layer that is selectively treated to form ion-conducting regions, or a layer that is selectively converted to a relatively more ion-conducting state in certain portions, for example by selectively hydrolyzing a Nation® precursor resin. Such conversion can be done at any suitable time in the process, such as before or after the electrically conductive pathways are embedded in the substrate. In some embodiments, the substrate can be more dimensionally stable in a less ion conducting or in a non-ion conducting form, which can in some embodiments provide advantages when using certain fabrication methods. The substrate material can be converted to a relatively ion-conducting state to form ion-conducting passageways using any suitable technique. By way of non-limiting example, ion-conducting passageways can be formed by selectively exposing areas of a substrate sheet to chemicals, radiation, heat or the like. Masks can be used to selectively expose areas of substrate sheet to chemicals, radiation, heat or the like. Other lithographic, etching and/or printed circuit board fabrication techniques can also be used. In one particular embodiment, where non-ion-conducting material is a resin precursor to Nafion®, conversion of non-ion-conducting material into an ion-conducting material in the selected locations of ion-conducting passageways can comprise masking a substrate sheet and selectively hydrolyzing areas of the sheet by exposure to water. Ion-conducting membranes formed by selective conversion of a substrate material can be tailored to provide different spatial membrane regions with different ion conductivity and/or mechanical characteristics to suit particular applications.

In FIG. 2A, a portion of substrate 202 is similar to a portion of substrate 102 in FIG. 1A. Ion-conducting layer 202 can have a first side 220 and a second side 222. A tool 210 carrying an electrically conductive thread 206 can puncture ion-conducting layer 202, as in FIG. 2B. Conventional sewing techniques can be used to dispose the electrically conductive thread in the aperture, as will readily be appreciated by one of skill in the art. A needle with a diameter of, for example, about 50 to about 300 µm can be used to insert a conductive thread. Where ion-conducting layer 202 includes a hydrolyzed resin, in some embodiments the inventive method can be performed on its dimensionally stable unhydrolyzed resin precursor, which can later be hydrolyzed, as discussed above. In FIG. 2C, the thread 206 is exposed on both sides 220 and 222 of ion-conducting layer 202, forming a conductive path. The conductive thread can be composed of any suitable number of fibers, and the fibers can include any suitable conductive material. Conductive thread 206 can be composed of multiple very thin fibers and can resultantly alter its cross sectional shape when pressed. In some embodiments, the electrically conductive element is sealed to the substrate sufficiently that the substrate is substantially gas impermeable without a pressing step or other treatment. In other embodiments, the ion-conducting layer can be pressed or otherwise treated to seal the layer. The characteristics of the conductive thread and the pitch of the stitching can be selected to provide the best combination of electrical performance and mechanical durability. For example, the conductive thread can include carbon fiber threads, threads including metals such as noble metals to promote conductivity, or the like.

Figure 2B:
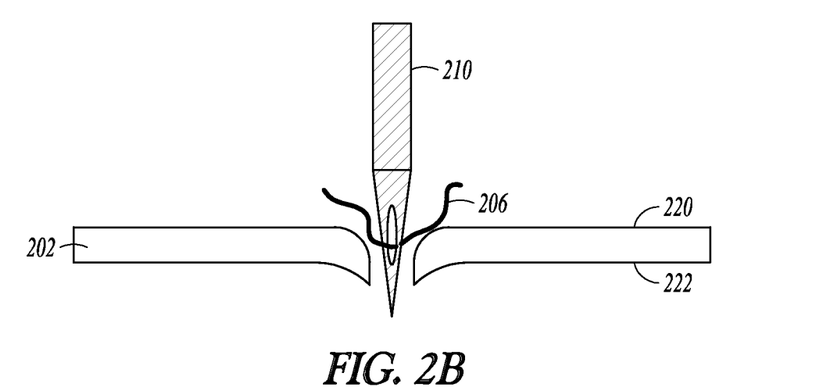
Figure 2C:
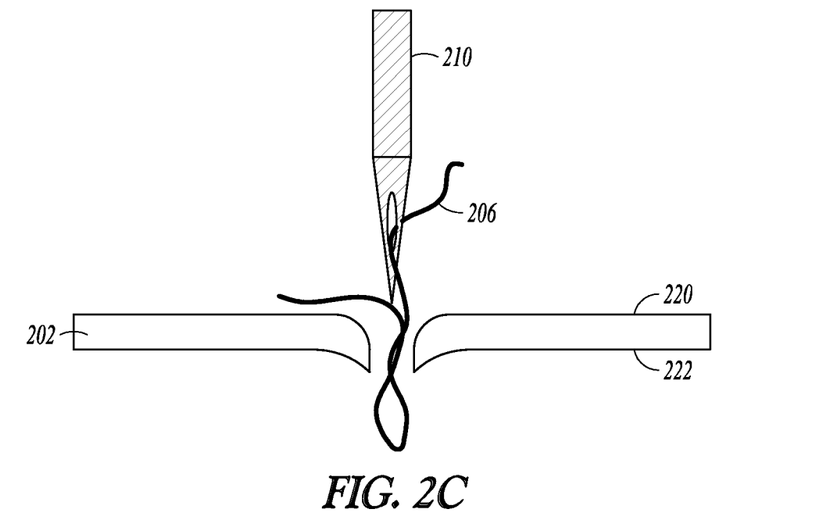
Figure 3A:
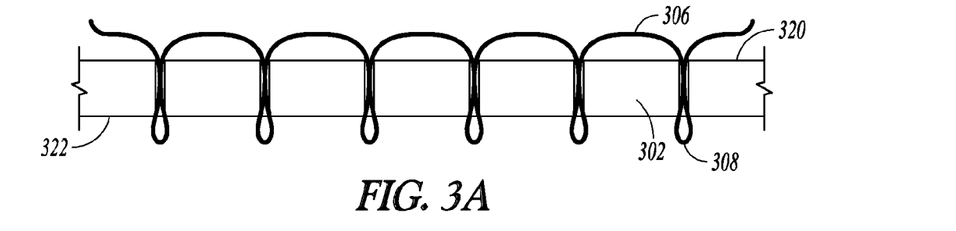
FIG. 3A illustrates a conductive line formed by an embodiment of the inventive method.
Figure 3B:
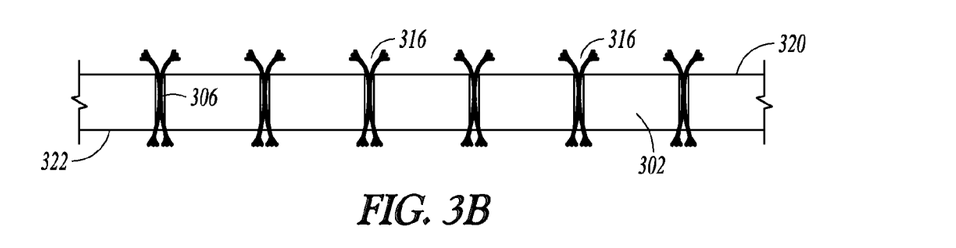
FIG. 3B illustrates a series of conductive paths formed by an embodiment of the inventive method.

FIGS. 3A-3B illustrate a cross sectional view of an electrically conductive line formed by the embodiment of FIG. 2. By making a line of through-plane conductive paths as shown, the overall cross sectional area of the through plane connection can be significantly increased, promoting improved electrical performance. Portions of conductive thread in FIG. 3A can be exposed, for example as loops 306 and 308, on opposite sides of substrate 302. These portions can be cut to create discrete electrically conductive paths with multiple exposed fiber ends 316 as in FIG. 3B which can be made to lay flat on the surface 322 of the ion-conducting layer 302 by suitable rolling, combing and pressing. Exposing multiple fiber ends can increase conductivity.

Figure 4:
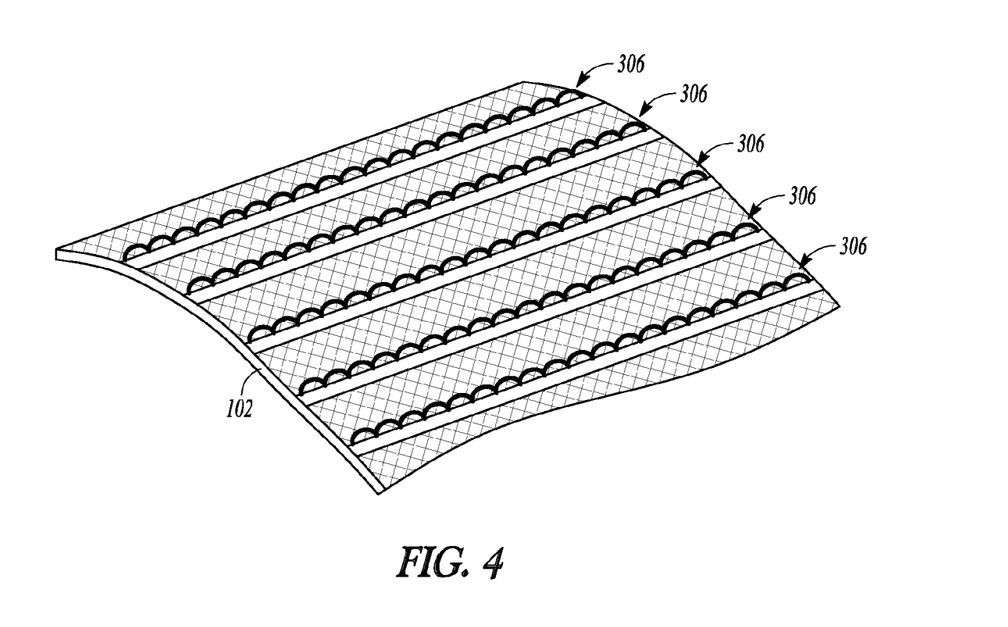
FIG. 4 illustrates an ion-conducting layer with conductive lines formed by an embodiment of the inventive method.

FIG. 4 shows a schematic view of a planar fuel cell array with electrically conductive passageways formed by the inventive method. A single thread can traverse the width of the ion-conducting membrane layer, or any suitable pattern can be implemented. The thread forms loops 306 in the substrate 102. Once a single thread has traversed a line, the loops can be cut to expose multiple fiber ends.

Figure 5A:
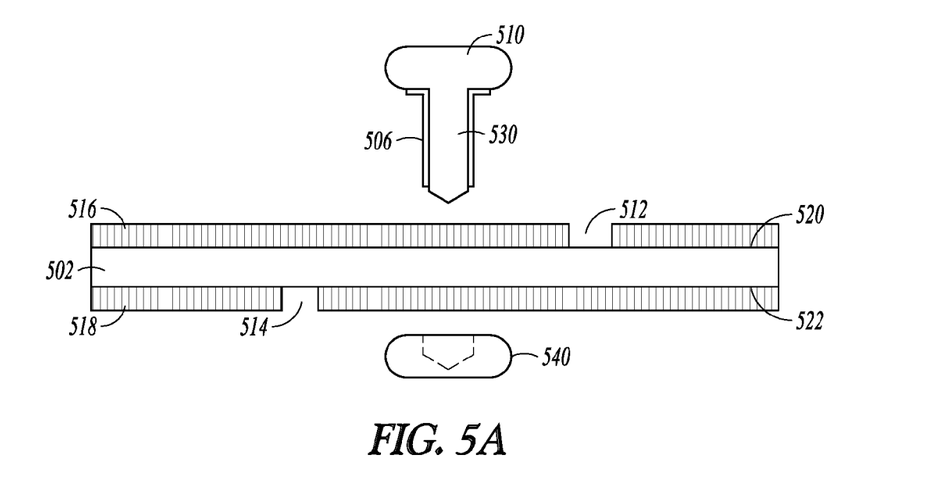
FIGS. 5A-5B illustrate a sequential depiction of an embodiment of the inventive method.
Figure 5B:
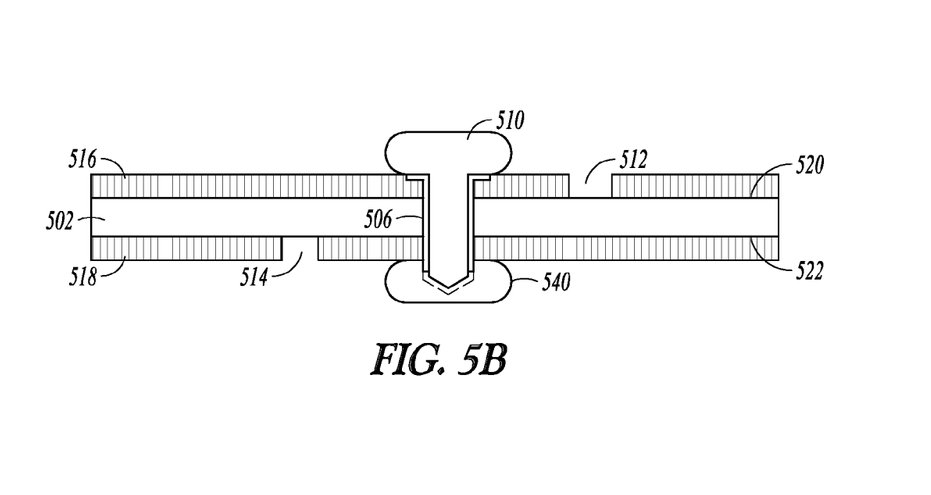

FIGS. 5A-5B illustrate a sequential depiction of one embodiment of the inventive method showing a cross-sectional view of an ion-conducting layer 502 being clamped by one or more preformed structured clamping elements 510 with one or more protrusions 530 having one or more electrically conductive layers 506. The one or more electrically conductive layers can be on any suitable part of the preformed element, for example, such that effective electrical connections are formed between the suitable electrodes of a planar fuel cell array. The preformed structured element can have faces approximately parallel to the plane of the substrate, and can have one or more protrusions 530 approximately orthogonal to the plane of the substrate. The protrusions can be any suitable shape. For example, the protrusions can have a point-shape at the end that is inserted through the substrate. For example, the protrusions can have a generally cylindrical shape, such that the majority of the protrusion can have substantially the same diameter. In some embodiments, the ion-conducting layer can include one or more coatings. FIGS. 5A and 5B illustrate a cross-sectional view of an ion-conducting layer 502 with coating 516 on its first side 520 and a coating 518 on its second side 522. The coating can include electrode or catalyst material. The coating can include regions of discontinuity 512 and 514. Examples of regions of discontinuity in one or more fuel cell layers are described in commonly-assigned US Patent Pub. No. 2009/0162722, filed 22 Dec. 2008 and entitled ELECTROCHEMICAL CELL ASSEMBLIES INCLUDING A REGION OF DISCONTINUITY, the disclosure of which is herein incorporated by reference in its entirety. The preformed structured clamping element 510 can be aligned with the coated ion-conducting layer or the regions of discontinuity thereon. The one or more electrically conductive layers, 506, can form an electrical connection with adjacent conductive layers on the substrate. Thus, the preformed element can provide a simple and efficient way to create electrically conductive pathways through the substrate to make a planar fuel cell array.

The preformed structured clamping element can have conductive surfaces large enough and suitably placed such that a good electrical connection with desired electrically conductive layers can be made. In some examples, the conductive surfaces are formed by coatings on the protrusion or on the parallel faces. In some examples, the conductive surfaces are formed by the protrusion being formed from a conductive material itself or from the parallel faces being formed from a conductive material itself. In some embodiments, conduction is provided by a combination of conductive coatings and the faces or protrusions being formed from conductive materials. The conductive surfaces can occur on any suitable part of the one or more protrusions, on any suitable part of the one or more parallel faces, or both. In some examples, the area of the parallel faces or the size of the protrusion can be sufficient for creating an interface area with the substrate in which a gas-tight seal can be formed. In some embodiments, compressive force between the two parallel faces of the preformed element can help to provide the gas-tight seal, and in some examples can provide other advantages of the compressive force further described herein. In one example, the one or more protrusions 530 with conductive layer 506 can puncture the ion-conducting membrane 502 and connect with a receiving clamp 540 on the opposite side of the ion-conducting layer. In some examples, the receiving clamp has a suitably sized conductive surface that can contact the conductive surface of the protrusion or an electrically conductive layer on the substrate, while in other embodiments, the receiving clamp does not have a conductive surface. In some examples, a tool can be used to partially or fully form the aperture, after which the protrusion can be passed therethrough. In various embodiments, a structured clamping element can have protrusions 530 which are not conductive but which perform purely structural functions, such as maintaining a compressive force between the top and bottom clamping elements. In use, in some examples the preformed structured clamping elements can be located over a region of overlap between anode and cathode regions of two fuel cells and then pressed so that the conductive protrusions puncture the ion-conducting membrane to create a conductive path from one surface to the opposite surface, e.g. from the anode of one fuel cell to the cathode of another adjacent fuel cell. Protrusions 530 can form a mechanical connection between the top structural component 510 and receiving clamp 540, holding them in place while the electrically conductive surface thereon can provide through-plane electrical conductivity. The mating of the protrusion 530 and a corresponding receiving clamp 540 can allow a static compressive loading on the substrate in the vicinity of a through-plane conductive protrusion.

In some embodiments, the preformed structured clamping element can bond a substrate such as an ion-conducting membrane to another component of a fuel cell system, such as a fluid manifold. This can eliminate the need for additional adhesive to bond multiple components. Examples of fluid manifolds are described in commonly-assigned US Patent Pub. No. 2009/0081493, filed 26 Mar. 2009 and entitled FUEL CELL SYSTEMS INCLUDING SPACE-SAVING FLUID PLENUM AND RELATED METHODS, the disclosure of which is herein incorporated by reference in its entirety.

Figure 6A:
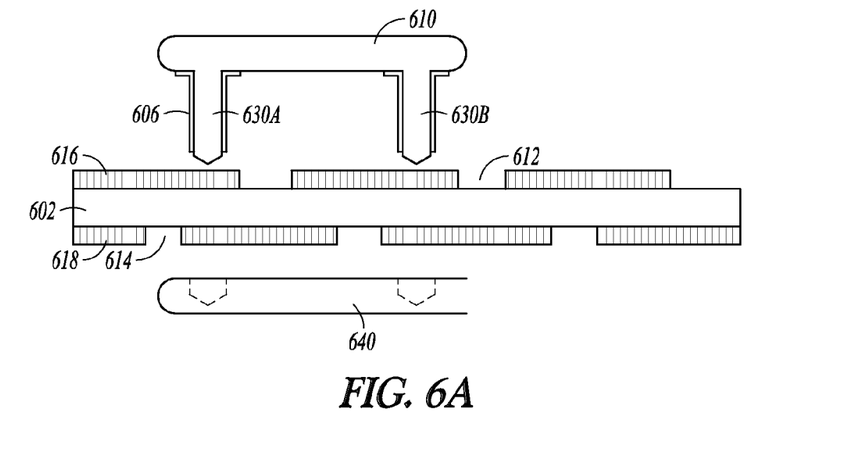
FIG. 6A illustrates an embodiment of the inventive method.
Figure 6B:
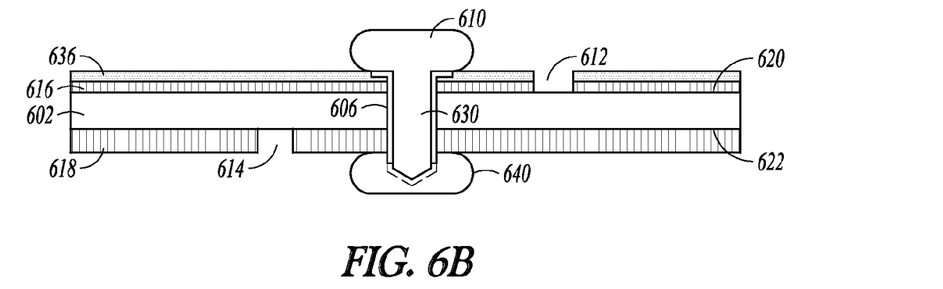
FIG. 6B illustrates an embodiment of the inventive method applied to an ion-conducting membrane including a performance enhancing layer.
Figure 6C:
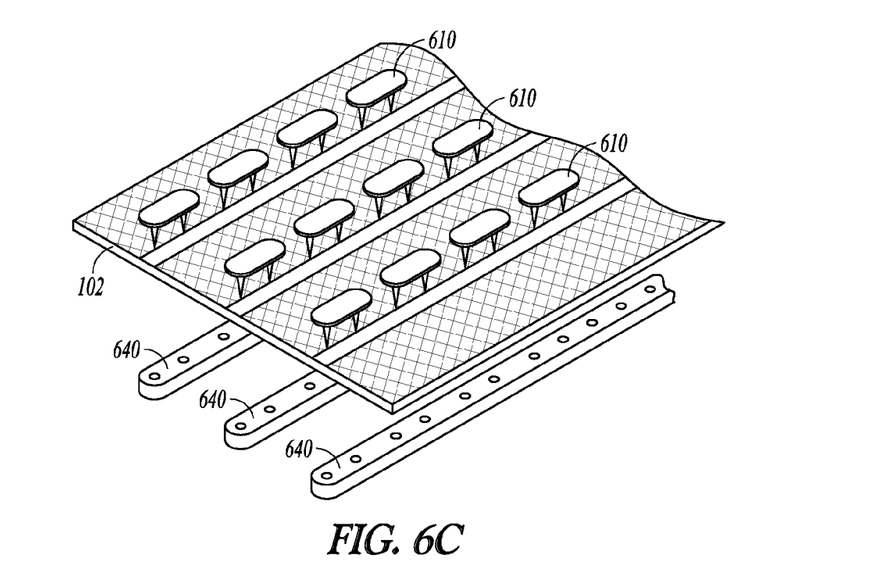
FIG. 6C illustrates an ion-conducting layer including preformed structural components formed by an embodiment of the inventive method.

The preformed structured clamping element can extend across the full width of the fuel cell layer, or, as shown in FIG. 6C, multiple, shorter clamping elements 610 and receiving clamp elements 640 can be installed in a row. Clamping elements can be arranged in any suitable and convenient pattern deemed appropriate for the overall electrochemical cell system design with regions of the clamping members rendered selectively electrically conductive in order to create a combined clamping and electrical interconnect configuration suitable for the particular fuel cell design. FIG. 6A illustrates a cross-sectional view of a top preformed structured clamping element 610 with multiple protrusions 630a and 630b having conductive coatings 606. Top clamping element 610 can puncture substrate 602 or can be inserted through a partially or fully pre-punctured substrate 602. Substrate 602 can have first coating 616 and second coating 618 and regions of discontinuity 612 and 614. Top clamping element 610 can couple with one or more receiving clamping elements 640 to form one or more conductive paths. A single receiving clamping element 640 can couple with one or more top clamping elements 610. A single top clamping element 610 can couple with one or more receiving clamp elements 640. In one example, the bulk of the top element is non-conductive, the protrusions 630 of the top element have conductive coatings, and the multiple protrusions 630 form interconnects which electrically connect neighboring unit fuel cells.

In some examples, the preformed structure can be formed from conductive or non-conductive materials. For example, the preformed structure can be formed from plastics or metals. In some examples, deposition of conductive materials onto the surface of the structure can provide a conductive surface on the structure. In examples wherein the preformed structure is formed of conductive materials, a deposition of conductive materials can allow the preformed structure to be more conductive. When installed, a low resistance conductive path can be formed between the cathode and anode of neighboring fuel cells. In some examples, preformed structures can further include sealing members to provide a means of preventing leakage around the puncturing protrusions. The sealing members can be any suitable shape, and can be made of any suitable material. For example, the sealing member can be in the form of a rubber ring or washer that fits between the substrate and a parallel face of the preformed structural element, or fits in another suitable location.

In some embodiments of the invention, the fuel cell layer includes one or more performance enhancing layers. Examples of such performance enhancing layers are described in commonly-assigned PCT International Published App. No. WO2011/079378, referenced above. FIG. 6B illustrates a cross sectional view of an ion-conducting membrane 602 with first side 620 and second side 622. First coating 616 and performance enhancing layer 636 can be disposed over and adjacent to first side 620, with region of discontinuity 612. Second coating 618 can be disposed over and adjacent to second side 622, with region of discontinuity 614. Top clamping element 610 with protrusion 630 having electrically conductive coating 606 can puncture the ion-conducting membrane and the performance enhancing layer (or be inserted through partially or fully pre-formed apertures) and can connect with bottom clamping element 640.

Figure 7A:
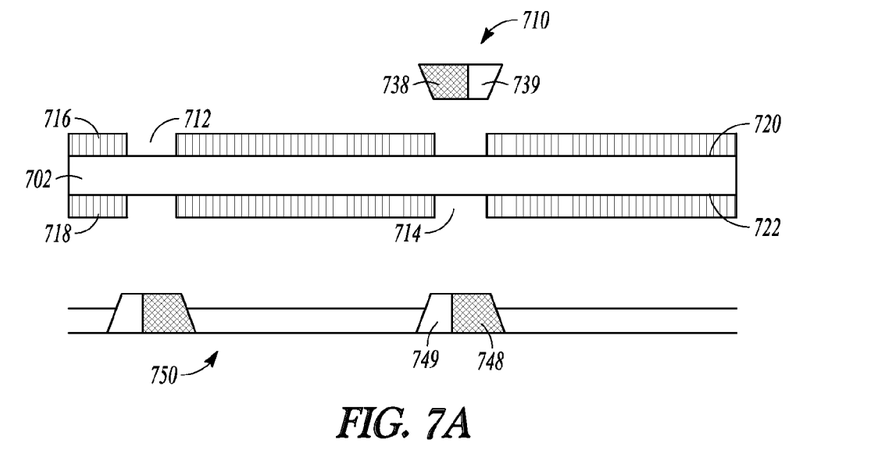
FIGS. 7A-7B illustrate a sequential depiction of an embodiment of the inventive method.

FIGS. 7A-7B illustrate a sequential depiction of one embodiment of the inventive method showing a cross-sectional view of an ion-conducting layer 702 with layer 716 of electrode material disposed on its first side 720, and layer 718 of electrode material disposed on is second side 722. Layers 716 and 718 have regions of discontinuity 712 and 714, respectively. Regions of discontinuity 712 and 714 can be long and narrow (e.g. strip-like), or they can be other shapes. In FIG. 7A, ion-conducting layer 702 can be aligned with a cap or insert 710 including electrically conductive portion 738 and non-conductive portion 739. The non-conductive portion 739 can be a dielectric portion. Cap 710 can be any suitable material, for example, 710 can be plastic or a dielectric material selectively coated to be made electrically conductive in the desired portions. Cap 710 can be long and narrow (e.g. strip-like), or any other suitable shape, generally such that the shape matches the shape of the discontinuity regions 712. A cap 710 can extend along the entire width of a fuel cell layer or multiple shorter caps can be provided, similarly to the multiple shorter clamping elements as shown in FIG. 6C. Since cap 710 contains both electrically conductive and non-conductive regions, non-conductive gaps between neighboring unit fuel cells hosted on a substrate can be omitted. This can reduce the complexity in forming a fuel cell array.

Figure 7B:
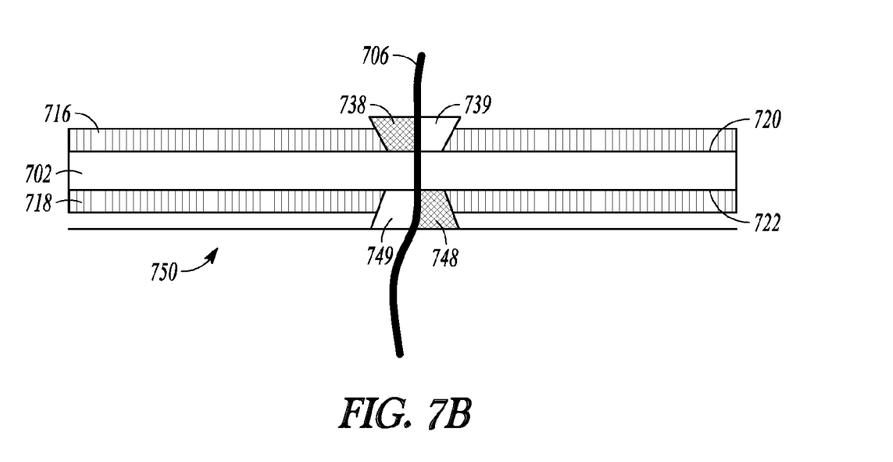

Ion-conducting layer 702 can also be aligned with a fluid manifold layer 750 including conductive portions 748 and non-conductive portions 749. In some examples, non-conductive portions 749 can be dielectric portions. In FIG. 7B, cap 710 is brought in proximity to one surface 720 of ion-conducting layer 702 while fluid manifold layer 750 is brought in proximity to opposite surface 722 of ion-conducting layer 702. An electrically conductive material 706 can be passed through cap 710, a portion of ion-conducting layer 702, and a portion of fluid manifold layer 750. Conductive material 706 can be in the form of a conductive thread, for example. In this example, cap 710 and manifold layer 750 act as clamping elements, without protrusions that form openings in ion-conducting layer 702. Cap 710 and manifold layer 750 therefore distribute the clamping load across the surface of the ion-conducting layer 702, which in some examples can reduce or eliminate the need for additional clamping components. Conductive thread 706 extends through ion-conducting layer 702. Thread 706 can be pulled tight to obtain a clamping force. The tightness of the thread can be suitably chosen to generate a desired amount of clamping force, such that, for example, a gas-tight seal is created. Alternatively, a conductive material can be inserted into cap 710 before the cap is brought into proximity with a surface of an ion-conducting layer 702.

Figure 8:
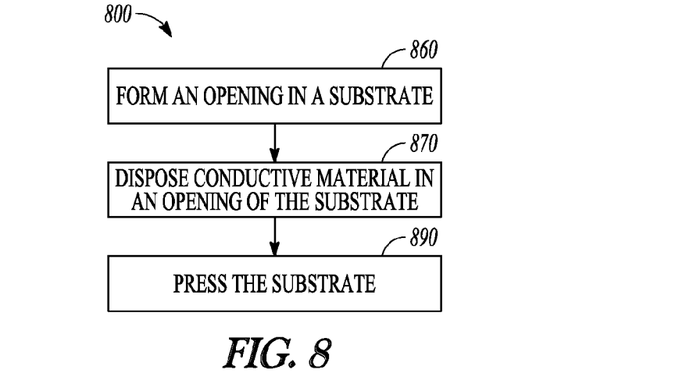
FIG. 8 illustrates a block flow diagram of the inventive method.

FIG. 8 illustrates a block flow diagram of an embodiment of the inventive method to form electrically conductive paths in a substrate. In method 800, an opening is formed in a substrate at stage 860. Conductive material is disposed in the openings of the substrate at stage 870. The substrate is pressed at stage 890, forming the conductive path that extends from the first side of the substrate to the second side. The pressure required to press the substrate can be between about 50 to about 200 psi, for example. The pressing of the substrate can be accompanied by a curing step, an annealing step, or combinations thereof. The pressing, curing and annealing can be performed consecutively or simultaneously.

The above description is intended to be illustrative, and not restrictive. Other embodiments can be used, such as by one of ordinary skill in the art upon reviewing the above description. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

Additional Embodiments

The present invention provides for the following exemplary embodiments, the numbering of which is not to be construed as designating levels of importance:

Embodiment 1 provides a method for forming an electrically conductive path, including: at least one of obtaining and providing a planar substrate having first and second major faces and a first volume, the substrate including at least one ionically conductive region; forming at least one aperture in the at least one ionically conductive region of the planar substrate, the aperture extending between the first and second faces and defining a punctured planar substrate having a second volume substantially the same as the first volume; and disposing an electrically conductive material in the aperture of the punctured planar substrate, to give the electrically conductive path extending between the first and second face; wherein the electrically conductive path is sealed to the substrate such that the substrate is substantially gas-tight between the first and second face.

Embodiment 2 provides the method of Embodiment 1, wherein the aperture is formed without the formation of one or more hanging chads.

Embodiment 3 provides the method of any one of Embodiments 1-2, wherein the method includes a method of manufacturing an electrochemical cell.

Embodiment 4 provides the method of any one of Embodiments 1-3, wherein the ion conducting region is a proton conducting region.

Embodiment 5 provides the method of any one of Embodiments 1-4, wherein the forming and the disposing are performed substantially simultaneously.

Embodiment 6 provides the method of any one of Embodiments 1-5, wherein a piercing element substantially simultaneously performs the forming and the disposing.

Embodiment 7 provides the method of any one of Embodiments 1-6, further including pressing the substrate or adding new material to the substrate, sufficient to seal the substrate such that the substrate is substantially gas-tight between the first and second face.

Embodiment 8 provides the method of Embodiment 7, wherein pressing the substrate includes applying compressive pressure to the first and second face of the substrate at least at the location of the deposited electrically conductive material.

Embodiment 9 provides the method of any one of Embodiments 7-8, wherein pressing the substrate seals the electrically conductive path extending between the first and second face from gas pressures up to about 15 psi.

Embodiment 10 provides the method of any one of Embodiments 7-9, wherein pressing the substrate includes rolling the substrate.

Embodiment 11 provides the method of any one of Embodiments 1-10, wherein disposing includes at least one of coating, inserting, pressing, and depositing.

Embodiment 12 provides the method of any one of Embodiments 1-11, wherein the electrically conductive path electrically connects an anode and a cathode of adjacent fuel cells.

Embodiment 13 provides the method of any one of Embodiments 1-12, wherein the conductive material includes a catalyst.

Embodiment 14 provides the method of any one of Embodiments 1-13, wherein the conductive material is selected from a powder, a liquid solution, a thread, a preformed structured element, and a non-porous component.

Embodiment 15 provides the method of Embodiment 14, wherein the conductive material is a thread, wherein after formation of the electrically conductive path extending between the first and second face, wherein at least one section of the thread extending outside the substrate is available for connection to one or more electrodes.

Embodiment 16 provides the method of any one of Embodiments 1-15, wherein a preformed structured element includes the conductive material.

Embodiment 17 provides the method of Embodiment 16, wherein the preformed structured element forms the aperture in the planar substrate.

Embodiment 18 provides the method of any one of Embodiments 16-17, wherein the preformed structured element includes at least two parallel faces.

Embodiment 19 provides the method of any one of Embodiments 16-18, wherein the preformed structured element further includes a sealing member.

Embodiment 20 provides the method of any one of Embodiments 1-19, wherein after the disposing, selectively treating one or more regions of the substrate such that the ion-conductivity of the one or more regions increases.

Embodiment 21 provides a method for forming an electrically conductive path, including: at least one of providing and obtaining a planar substrate having a first and second major face, the substrate including at least one ionically conductive region; making at least one aperture in the at least one ionically conductive region of the planar substrate, wherein the aperture extends between the first and second faces, wherein substantially none of the planar substrate is removed during aperture formation; and disposing an electrically conductive material in the aperture to give an electrically conductive path including the electrically conductive material, wherein the electrically conductive path extends between the first and second face; wherein the electrically conductive path is sealed to the substrate such that the substrate is substantially gas-tight between the first and second face.

Embodiment 22 provides a method for forming an electrically conductive path, including: at least one of obtaining and providing a planar ion-conducting substrate having first and second major faces and a first volume, the substrate including at least one ionically conductive region; forming at least one aperture in the at least one ionically conductive region of the planar substrate, the aperture extending between the first and second faces and defining a punctured planar substrate having a second volume substantially the same as the first volume; and disposing an electrically conductive material in the aperture of the punctured planar substrate, to give the electrically conductive path extending between the first and second face; wherein the planar substrate includes an upper first volume that includes the first major face, and a lower first volume that includes the second major face, and wherein the punctured planar substrate includes an upper second volume that includes that first major face and that corresponds to the upper first volume, and a lower second volume that includes the second major face and that corresponds to the lower first volume, wherein the first upper volume is substantially the same as the second upper volume, wherein the first lower volume is substantially the same as the second lower volume; wherein the electrically conductive path is sealed to the substrate such that the substrate is substantially gas-tight between the first and second face.

Embodiment 23 provides the apparatus or method of any one or any combination of Embodiments 1-22 optionally configured such that all elements or options recited are available to use or select from.

What is claimed, is:

1. A method for forming an electrically conductive path, comprising:
    at least one of obtaining and providing a planar substrate having first and second major faces and a first volume, the substrate comprising at least one ionically conductive region;
    forming at least one aperture in the at least one ionically conductive region of the planar substrate, the aperture extending between the first and second faces and defining a punctured planar substrate having a second volume substantially the same as the first volume; and
    disposing an electrically conductive material in the aperture of the punctured planar substrate, to give the electrically conductive path extending between the first and second faces;
    wherein the electrically conductive path is sealed to the substrate such that the substrate is substantially gas-tight between the first and second faces; and,
    wherein the electrically conductive material is a thread which is disposed by a sewing technique, said thread comprising a plurality of fibers;
    wherein the disposing by a sewing technique provides a first exposed portion of the thread on the first major face and a second exposed portion of the thread on the second major face; and,
    wherein the method further comprises cutting the first and second exposed portions to create a discrete electrically conductive path within each aperture having multiple exposed fiber ends.

2. The method of claim 1, wherein the aperture is formed without the formation of one or more hanging chads.

3. The method of claim 1, wherein the method comprises a method of manufacturing an electrochemical cell.

4. The method of claim 3, wherein the at least one aperture is formed while removing substantially no material from the planar substrate.

5. The method of claim 1, wherein the ionically-conductive region is a proton conducting region.

6. The method of claim 1, wherein the forming and the disposing are performed substantially simultaneously.

7. The method of claim 1, wherein a piercing element substantially simultaneously performs the forming of the membrane and the disposing of the electrically conductive material.

8. The method of claim 1, further comprising pressing the substrate or adding new material to the substrate, sufficient to seal the substrate such that the substrate is substantially gas-tight between the first and second face.

9. The method of claim 8, wherein pressing the substrate includes applying compressive pressure to the first and second face of the substrate at least at the location of the deposited electrically conductive material.

10. The method of claim 8, wherein pressing the substrate seals the electrically conductive path extending between the first and second face from gas pressures up to about 15 psi.

11. The method of claim 8, wherein pressing the substrate comprises rolling the substrate.

12. The method of claim 1, wherein disposing includes at least one of coating, inserting, pressing, and depositing.

13. The method of claim 1, wherein the electrically conductive path electrically connects an anode and a cathode of adjacent fuel cells.

14. The method of claim 1, wherein the conductive material comprises a catalyst.

15. The method of claim 1, wherein the conductive material is selected from a powder, a liquid solution, a thread, a preformed structured element, and a non-porous component.

16. The method of claim 15, wherein the conductive material is a thread, wherein after formation of the electrically conductive path extending between the first and second face, wherein at least one section of the thread extending outside the substrate is available for connection to one or more electrodes.

17. The method of claim 15, wherein a preformed structured element comprises the conductive material.

18. The method of claim 17, wherein the preformed structured element forms the aperture in the planar substrate.

19. The method of claim 17, wherein the preformed structured element comprises a clamp.

20. The method of claim 17, wherein the preformed structured element further comprises a sealing member.

21. The method of claim 1, wherein after the disposing, one or more regions of the substrate are selectively treated to increase the ion-conductivity of those regions.

22. The method of claim 1, wherein the plurality of fibers comprise one or more of carbon fiber and metals.

23. The method of claim 22, wherein the plurality of fibers comprise carbon fiber.

24. The method of claim 22, wherein the plurality of fibers comprise one or more metals.

25. The method of claim 24, wherein the one or more metals are noble metals.

26. The method of claim 22, wherein the plurality of fibers comprise one or more fibers of carbon fiber and one or more fibers of metal.

27. The method of claim 1, wherein the method further comprises one or more of rolling, combing, and pressing the exposed fiber ends to make the exposed fiber ends lay flat on the first and second major faces.

28. The method of claim 1, wherein:
    the at least one ionically conductive region of the planar substrate comprises a resin;
    the disposing step is performed on the at least one ionically conductive region as a dimensionally stable unhydrolyzed resin precursor;
    the method further comprises hydrolyzing the dimensionally stable unhydrolyzed resin precursor to form a hydrolyzed resin after the disposing step is performed.

29. A method for forming an electrically conductive path, comprising:

at least one of obtaining and providing a planar substrate having a first and second major face, the substrate comprising at least one ionically conductive region;

making at least one aperture in the at least one ionically conductive region of the planar substrate, wherein the aperture extends between the first and second faces, wherein substantially none of the planar substrate is removed during aperture formation; and disposing an electrically conductive material in the aperture to give an electrically conductive path comprising the electrically conductive material, wherein the electrically conductive path extends between the first and second face;

wherein the electrically conductive material is a thread which is disposed by a sewing technique, said thread comprising a plurality of fibers wherein the electrically conductive path is sealed to the substrate such that the substrate is substantially gas-tight between the first and second face;

wherein the disposing by a sewing technique provides a first exposed portion of the thread on the first major face and a second exposed portion of the thread on the second major face, and wherein the method further comprises cutting the first and second exposed portions to create a discrete electrically conductive path within each aperture having multiple exposed fiber ends.

30. A method for forming an electrically conductive path, comprising:

at least one of obtaining and providing a planar ion-conducting substrate having first and second major faces and a first volume, the substrate comprising at least one ionically conductive region;

forming at least one aperture in the at least one ionically conductive region of the planar substrate, the aperture extending between the first and second faces and defining a punctured planar substrate having a second volume substantially the same as the first volume; and disposing an electrically conductive material in the aperture of the punctured planar substrate, to give the electrically conductive path extending between the first and second face;

wherein the planar substrate comprises an upper first volume that includes the first major face, and a lower first volume that includes the second major face, and wherein the punctured planar substrate comprises an upper second volume that includes that first major face and that corresponds to the upper first volume, and a lower second volume that includes the second major face and that corresponds to the lower first volume, wherein the first upper volume is substantially the same as the second upper volume, wherein the first lower volume is substantially the same as the second lower volume;

wherein the electrically conductive path is sealed to the substrate such that the substrate is substantially gas-tight between the first and second face;

wherein the electrically conductive material is a thread which is disposed by a sewing technique, said thread comprising a plurality of fibers wherein the disposing by a sewing technique provides a first exposed portion of the thread on the first major face and a second exposed portion of the thread on the second major face, and wherein the method further comprises cutting the first and second exposed portions to create a discrete electrically conductive path within each aperture having multiple exposed fiber ends.

* * * * *